United States Patent
Xu

(10) Patent No.: US 10,107,714 B2
(45) Date of Patent: Oct. 23, 2018

(54) MERGING TECHNIQUE FOR OTDR TRACES CAPTURED BY USING DIFFERENT SETTINGS

(71) Applicant: AFL TELECOMMUNICATIONS LLC, Duncan, SC (US)

(72) Inventor: Fang Xu, Newton, MA (US)

(73) Assignee: AFL Telecommunications, LLC, Duncan, SC (US)

(*) Notice: Subject to any disclaimer, the term of this patent is extended or adjusted under 35 U.S.C. 154(b) by 0 days.

(21) Appl. No.: 15/523,467

(22) PCT Filed: Nov. 4, 2015

(86) PCT No.: PCT/US2015/058997
§ 371 (c)(1),
(2) Date: May 1, 2017

(87) PCT Pub. No.: WO2016/073579
PCT Pub. Date: May 12, 2016

(65) Prior Publication Data
US 2017/0322112 A1 Nov. 9, 2017

Related U.S. Application Data

(60) Provisional application No. 62/074,883, filed on Nov. 4, 2014.

(51) Int. Cl.
G01N 21/00 (2006.01)
G01M 11/00 (2006.01)
H04B 10/071 (2013.01)

(52) U.S. Cl.
CPC .... G01M 11/3145 (2013.01); G01M 11/3127 (2013.01); H04B 10/071 (2013.01)

(58) Field of Classification Search
CPC ............ G01M 11/00; G01M 11/3145; G01M 11/3127; H04B 10/071
See application file for complete search history.

(56) References Cited

U.S. PATENT DOCUMENTS

| | | |
|---|---|---|
| 5,062,704 A | 11/1991 | Bateman |
| 5,528,356 A | 6/1996 | Harcourt |
| 5,708,500 A | 1/1998 | Anderson |
| 5,963,313 A | 5/1999 | Anderson |

(Continued)

FOREIGN PATENT DOCUMENTS

JP 2016053542 A 4/2016

OTHER PUBLICATIONS

AFL Telecommunications LLC; International Patent Application No. PCT/US2015/058997; International Search Report; dated Jan. 20, 2016; (1 page).

(Continued)

*Primary Examiner* — Jamil Ahmed
(74) *Attorney, Agent, or Firm* — Dority & Manning, P.A.

(57) ABSTRACT

An Optical Time Domain Reflectometer (OTDR) tests an optical fiber by generating, transmitting, and receiving light signals from an optical fiber. The OTDR generates light signals having different characteristics and stitches these light signals into an OTDR trace. Backscatter and properties such as dynamic range effect the quality of the OTDR trace.

10 Claims, 5 Drawing Sheets

(56) References Cited

U.S. PATENT DOCUMENTS 8,390,797 B2     3/2013   Woodward et al.
2013/0088718 A1*   4/2013   Perron ............... G01M 11/3127
                                                                       356/445

OTHER PUBLICATIONS

AFL Telecommunications LLC; European Patent Application No. EP15857483; Supplementary European Search Report; dated Jun. 5, 2018; (2 pages).

* cited by examiner

MERGING TECHNIQUE FOR OTDR TRACES CAPTURED BY USING DIFFERENT SETTINGS

CROSS-REFERENCE TO RELATED APPLICATION

This application is based upon and claims the benefit of priority from U.S. Provisional Patent Application No. 62/074,883, filed Nov. 4, 2014 in the United States Patent and Trademark Office, and as a U.S. national stage filing of International Application No. PCT/US2015/058997 having an international filing date of Nov. 4, 2015, the disclosures of both of which are incorporated by reference herein in their entireties.

TECHNICAL FIELD

Exemplary embodiments relate to an Optical Time Domain Reflectometer (OTDR), and more particularly to merging OTDR traces generated by an OTDR using different settings respectively.

BACKGROUND ART

An OTDR is an instrument used to detect and characterize features in an optical fiber. These features may include spontaneous increase of signal level due to reflection at a small air gap between parts of a connector, or a drop of signal level caused by a splice loss or a power splitter. In some situations, reflectance or optical loss could represent a defective fiber.

An OTDR analyzes optical signals through an optical fiber and may output such signals as OTDR traces. OTDR traces are generally captured in the presence of noise making it difficult to detect or reliably characterize signal characteristics having a magnitude less than that of the noise.

In addition to noise, dynamic range and dead-zone of OTDR traces are relevant to OTDR instrumentation. Dynamic range is a backscatter level at the entrance of a fiber compared to noise level such that a better dynamic range indicates a smaller noise level. Dead-zone is a section of an OTDR trace immediately following a spontaneous increase of signal level due to reflection, such that a trace may appear functionally saturated, before the power of received light falls within some level, such as 1.5 dB for reflective event and 0.5 dB for non-reflective event.

Present techniques for overcoming such noise and inability to interpret signal characteristics, such as within a dead-zone of an OTDR trace, have disadvantageous. Increasing the power of a light pulse may increase the complexity and price of an instrument, as well as may cause safety issues. Averaging repeated measurement results may increase test time and thereby decrease productivity. Increasing a duration of a light pulse may cause an OTDR trace to exhibit at least longer dead-zones thereby preventing any measurement during a greater portion of the trace. Applying a filter to an OTDR trace may have similar effect as increasing a duration of a light pulse, and the effect of the filter may diminish as length of the filter increases. Accordingly, a technique for OTDR traces is needed which may overcome these disadvantages.

Solution to Problem

In accordance with an aspect of the present invention(s), there are several modifications to OTDR systems that can provide improved measurement accuracy. This includes capturing a series of OTDR traces, that use different light pulse-widths optimized to capture different characteristics of the same test network. These traces are then stitched together to produce a composite or merged trace that uses the optimum elements from each individual trace. This composite trace provides shorter dead-zones with higher noise immunity than a single trace using a single pulse-width.

It is an aspect of the exemplary embodiments to provide an OTDR capable of dealing with events and short pulse-width signals without sufficient dynamic range. For example, for a fast falling of a short pulse-width trace, an OTDR may be configured to determine a point where a shorter pulse-width trace and a longer pulse-width trace intercept. If an OTDR trace distance to the point of intersection of the two traces exceeds a distance of a dead-zone of the longer pulse-width trace and there is no significant signal level rise within this distance, then the OTDR will add data from at least the shorter pulse-width trace, or its filtered version, to an OTDR trace, even when the shorter pulse-width changes rapidly. The OTDR trace may continue to add data from the shorter pulse-width trace until the two traces reach the same level, at which point the longer pulse-width trace and shorter traces may be stitched together, or other optical characteristics are detected.

Advantageous Effects of Invention

Advantages and benefits of the above-described exemplary embodiments include, but are not limited to merged traces having simultaneously lower backscatter noise levels and a shorter dead-zone, overall, as compared to a trace captured with a pulse-width longer than the shortest pulse-width and shorter than the longest pulse-width used before a merge or stitching process.

DESCRIPTION OF EMBODIMENTS

Figure 1:
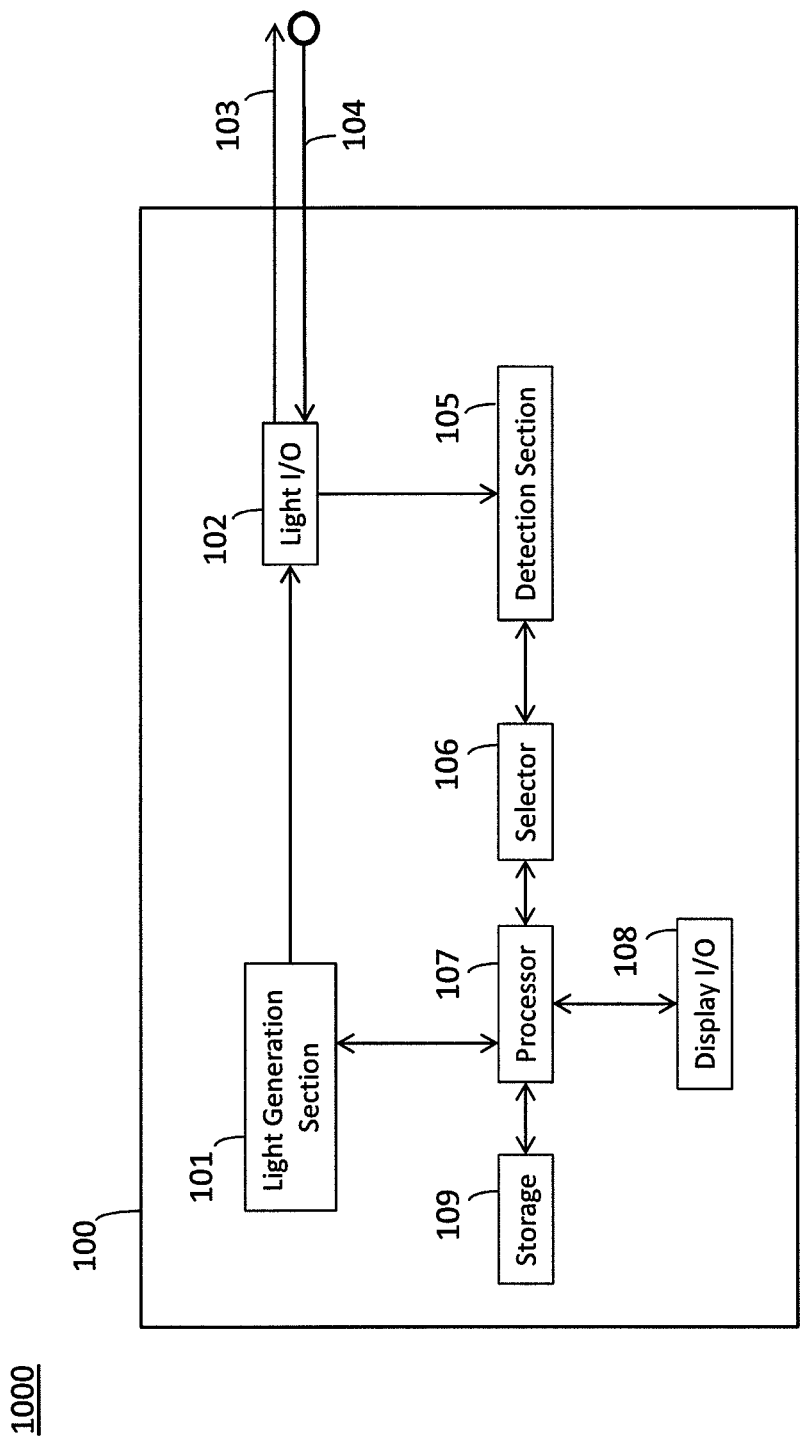
FIG. 1 illustrates an OTDR system including input and output sections according to exemplary embodiments.

Reference will now be made in detail to exemplary embodiments, examples of which are illustrated in the accompanying drawings, wherein like reference numerals refer to like elements throughout. However, known functions associated with the exemplary embodiments or detailed descriptions on the configuration and other matters which would unnecessarily obscure the present disclosure will be omitted.

FIG. 1 is a view of an OTDR system 1000 including a light generation section 101, a light I/O 102, an exit path 103, a return path 104, a detection section 105, a selector 106, a processor 107, a display 108 and a memory or storage 109.

The memory or storage 109 may store executable instructions that, when executed by the processor 107, cause the processor to perform algorithms according to exemplary embodiments.

According to exemplary embodiments, the processor 107 of the OTDR system 1000 algorithms control the light generation section 101 to generate light pulses having different durations, pulse-width, to be sent to a fiber through exit path 103 of the light I/O 102 and to be reflected from the fiber through the return path 104 of the light I/O 102. The processor 107 may also be configured to control the light generation section 101 to generate light pulses not only having different pulse-width respectively, but also having different intensity and repetitions of previously transmitted light signals according to algorithms.

The detection section 105 receives the light signals, having at least respectively different pulse-width, from the return path 104 of the light I/O 102 and converts the light signals into electrical signals, such as by a photodetector according to exemplary embodiments.

The optical signals, having at least different pulse-width, may be further processed with respective gains, such as a low-level gain to accommodate high-amplitude signal at a near end, close to the OTDR, and a high-level gain to accommodate a low-amplitude signal for a far end, away from the OTDR, along a fiber. As discussed further below, the optical signals may be stitched into a single OTDR trace in a horizontal direction of the trace, where the horizontal direction of the trace may represent distance from the OTDR.

Various methods for processing light signals according to exemplary embodiments include, increasing power of light pulse, repeating and averaging measurements, increasing duration of a light pulse and filtering captured traces, at least to reduce noise levels.

Figure 4:
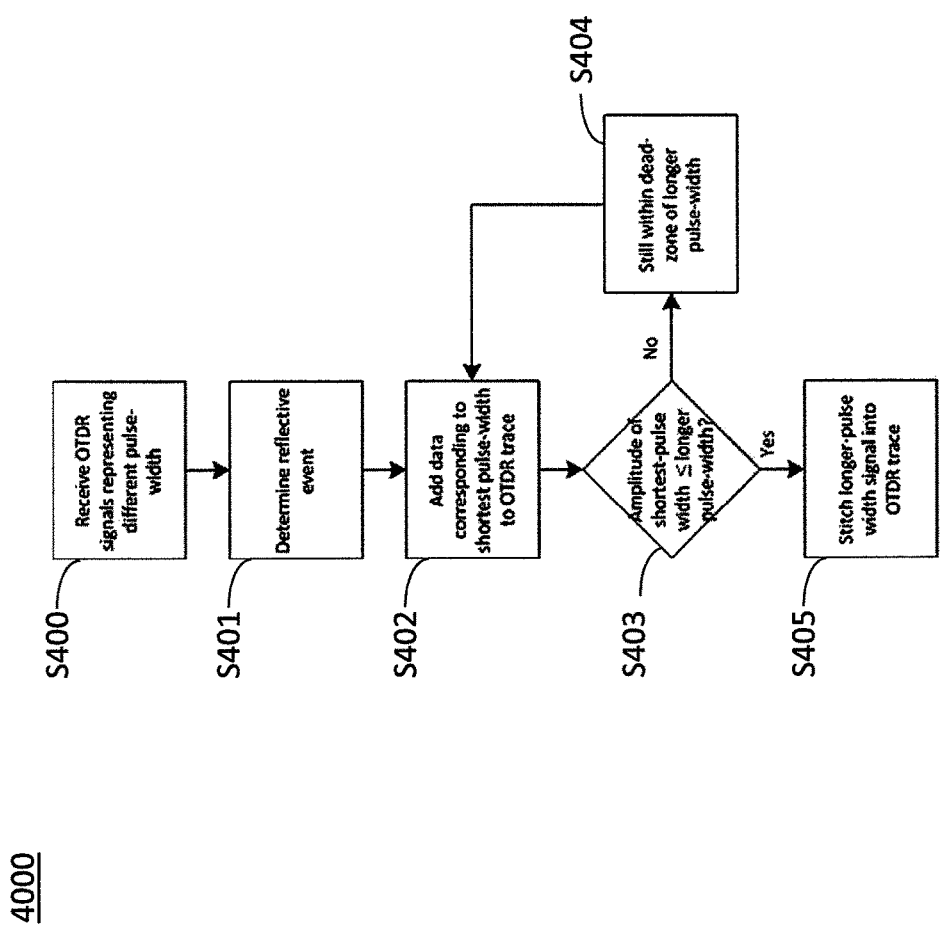
FIG. 4 illustrates a flowchart according to exemplary embodiments.

The selector 106 receives the electrical signals corresponding to the light signals, having at least respectively different pulse width, and may be controlled by the processor 107 to select various ones of the electrical signals and various portions of the electrical signals for being output to an OTDR trace by the display 108, as further discussed with respect to the flowchart of FIG. 4.

The processor 107 further stores such data in a memory 109 and processes the stored data to provide outputs to at least the display 108.

Figure 2:
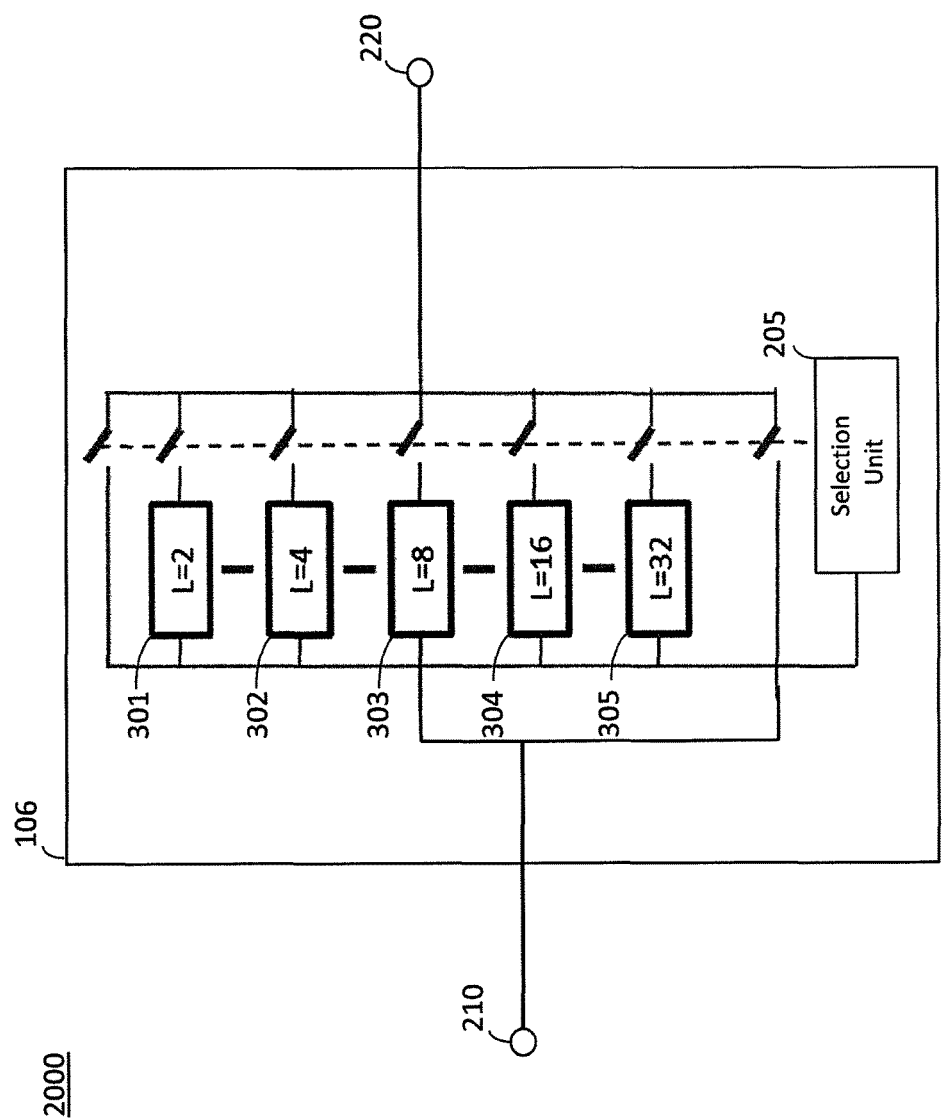
FIG. 2 illustrates a selector section according to exemplary embodiments.

FIG. 2 is a view of a selector section 2000 including the selector 106 having an input 210 and an output 220. The input 210 and the output 220 may each represent more than one signal path according to exemplary embodiments. A selection unit 205 of the selector 106 operates in conjunction with the processor 107 or may autonomously operate to determine signals and portions of signals to be displayed by the display 108. The selector 106 further includes receivers 201-205 each configured to receive and buffer signals corresponding to at least respective pulse-width denoted by "L".

Figure 3A:
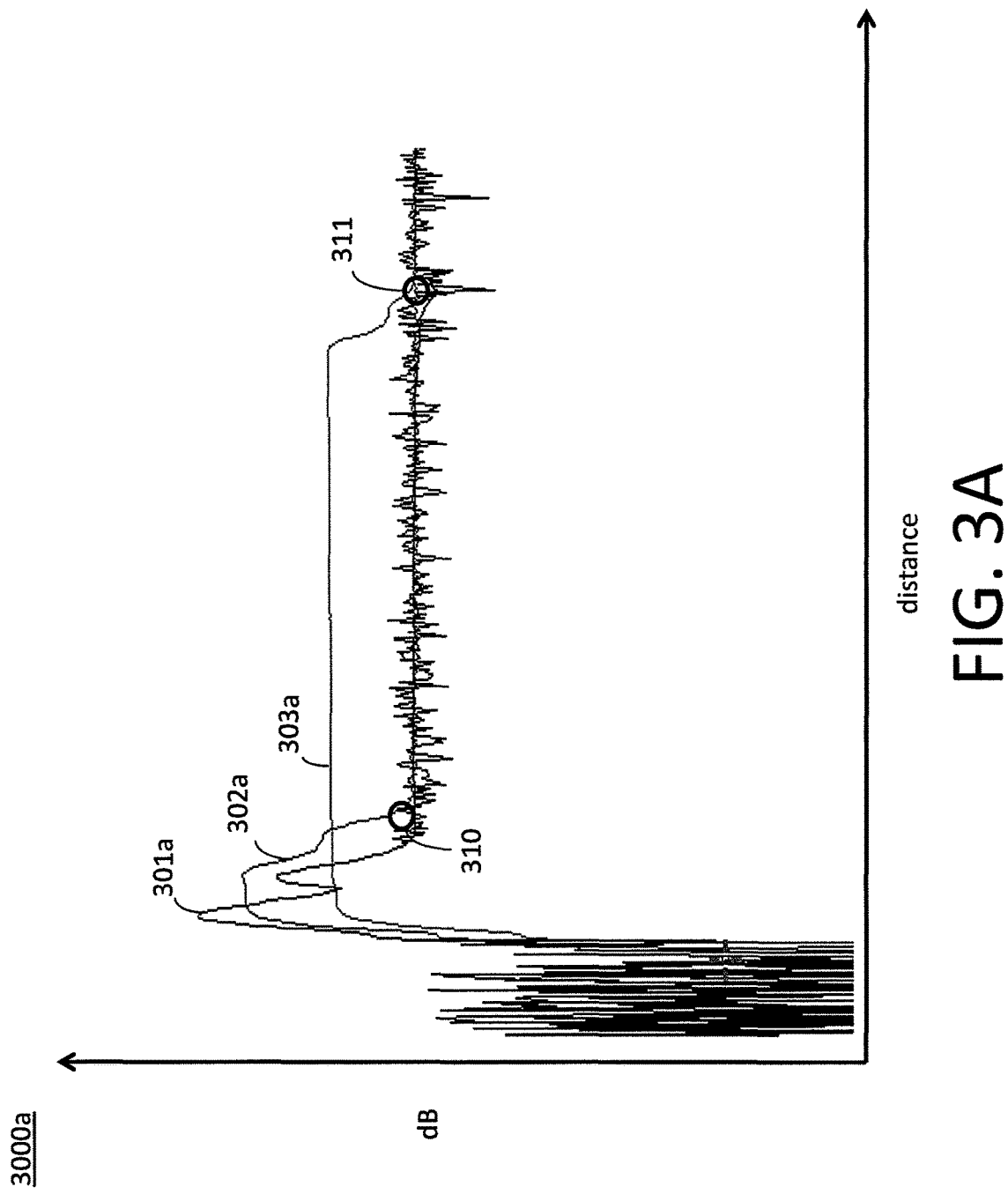
FIGS. 3A and 3B illustrates OTDR traces according to exemplary embodiments.

FIG. 3A illustrates a graph 3000a including various OTDR traces 301a-303a each representing light signals having different pulse-width. For example, trace 301a may represent a light signal having a 5 ns pulse-width; trace 302a may represent a light signal having a 30 ns pulse-width, and trace 303a may represent a light signal having a 300 ns pulse-width.

To reduce scaling errors of the traces, backscatter levels of at least two traces obtained by using different pulse-width may be normalized by multiplying each trace by a product of pulse-width, number of averages and gain of another trace, according to exemplary embodiments. These coefficients could be divided by a maximum common denominator before the normalization to avoid processing overflow. Although at least two traces may be normalized as described above, more than two traces may also be normalized similarly by multiplying each trace by a product of pulse-width, number of averages and gain of another trace, according to exemplary embodiments.

The trace 302a ends its respective dead-zone and intersects the trace 301a at stitching point 310. The trace 303a ends its respective dead-zone and intersects the trace 302a at stitching point 311.

As illustrated in FIG. 3A, the trace 301a experiences the shortest dead-zone, and the trace 303a experiences the longest dead-zone. Further, the trace 301a experiences the greatest amount of noise after its respective dead-zone, and the trace 303a experiences the least amount of noise after its respective dead-zone. The shorter pulse-width trace 301a, although noisier than the longer pulse width trace 303a, exhibits optical characteristics at a shorter fiber distance than the longer pulse-width trace 303a at least because of the shorter dead-zone of the shorter pulse-width trace 301a; further, the characteristics at the shorter fiber distance exhibited by the shorter pulse-width trace 301a are not exhibited by the longer pulse-width trace 303a because of its respective dead-zone.

Figure 3B:
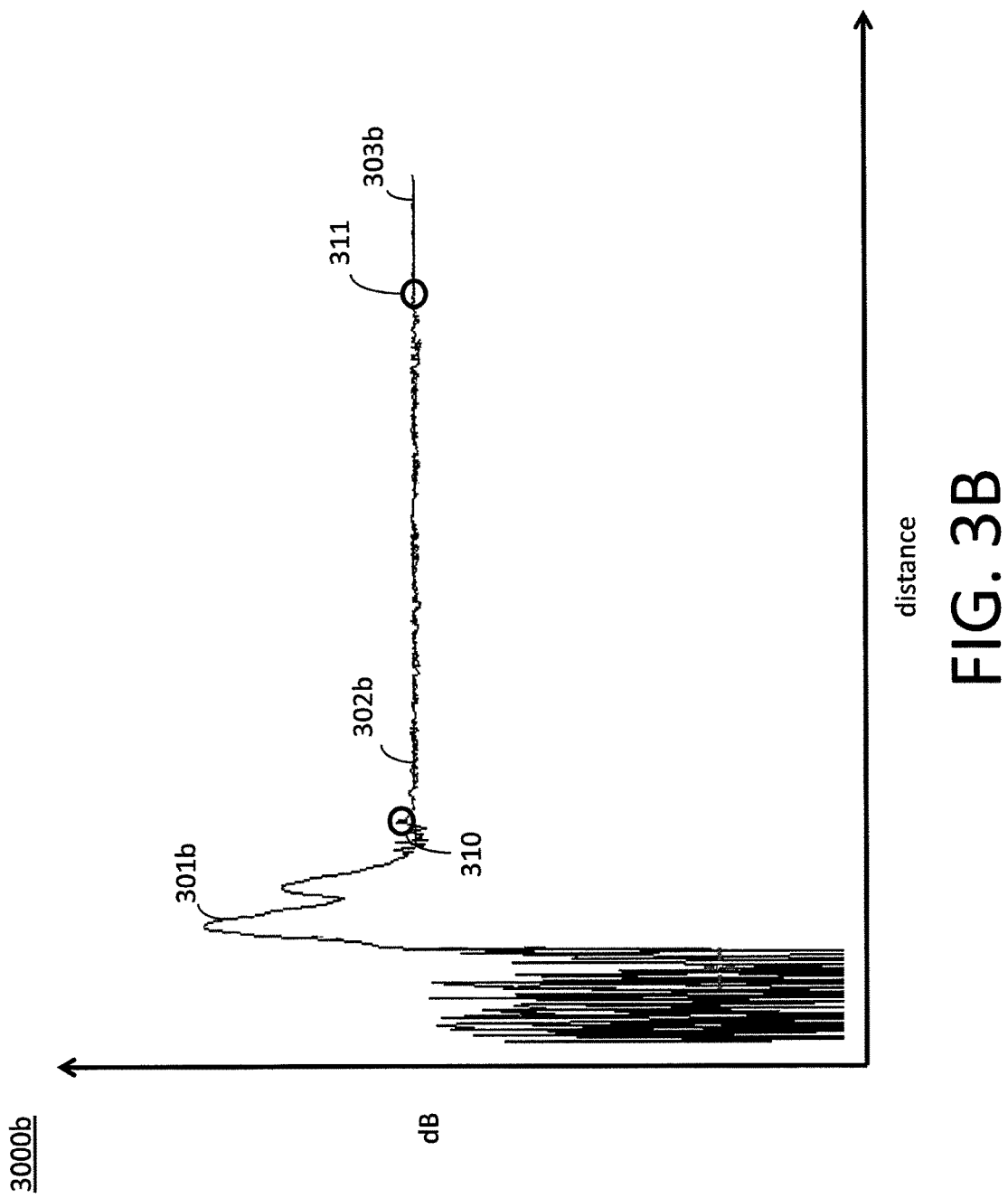

FIG. 3B illustrates a graph 3000b having trace portions 301b-303b stitched together from the traces 301a-303a of graph 3000a. For example, as trace 301a experiences a shortest dead-zone by representing at least a shortest pulse-width, the portion 301b of the trace 301a is selected as a portion to be displayed by the graph 3000b.

The trace 302b experiences less noise than the trace 301a; however, the trace 302b has a longer dead-zone. The dead-zone of the trace 302b ends at stitching point 310 and therefore, the trace 302b may be prioritized over the noisier trace 301a. A trace portion trace 302b of the trace 302a is stitched to the noisier trace portion 301b.

Although trace portion trace 301b is noisier than trace portion 302b, the trace portion 301b provides non-dead-zone data at a shorter distance than could be reliably represented the longer pulse represented by the trace 301b.

Further, the stitching point 311 represents a point where the dead-zone of the trace 303a has ended and is prioritized over the noisier trace 302a, and therefore, the trace portion 303b may be stitched at stitching point 311 thereby providing a less noisy signal at greater distances from the OTDR.

The stitching may be progressive rather than sudden. For example, areas around the stitching point 310 and stitching point 311 may be ratios of the signals about the respective points. The ratio may be different at each stitching point.

Further, the traces 301a-303a also have different gains applied thereto respectively in addition to representing different pulse-width signals and therefore may reduce scaling of an OTDR trace.

Meanwhile, if the data of the stitched OTDR trace comes from either the shorter pulse-width signal or the longer pulse-width signal, there may be one unused trace. According to exemplary embodiments, the longer pulse-width signal may be replaced by a combined trace from the two traces according to the following formula:

$$L'(n) = a*L(n) + b*S'(n) \tag{1}$$

L(n) denotes a longer pulse-width signal, S'(n) denotes a moving average filtered version of a shorter pulse-width signal S(n); "a" and "b" are two parameters to be chosen such that a ratio of total noise of L' (n) to combined minimizes a backscatter noise level. It is noted that the pulse-width of S(n) is Ps, the shorter pulse-width, and in order to obtain S'(n) in view of the longer pulse-width P1 as L(n), the optimum moving average filter length to compute S'(n) from S(n) should be P1-Ps.

FIG. 4 illustrates flowchart 4000 of an algorithm performed according to exemplary embodiments. At S400 an OTDR receives signals representing at least different pulse-width.

At S401, the OTDR determines that the signals rise spontaneously and amplitude of a short pulse-width trace is greater than amplitude of a longer pulse-width trace.

At S402, the OTDR adds data corresponding to the short pulse-width signal even though this signal may be noisy. A filtered version of the short pulse-width signal may be added.

At S403, the OTDR compares the amplitude of the short pulse-width signal to that of a longer pulse-width signal.

At S404, the OTDR has determined that the amplitude of the short pulse-width signal is greater than that of the longer pulse-width signal, and therefore, the longer pulse-width signal remains in a dead-zone. Processing returns to S403.

This process may continue until the short pulse-width trace has a number of points having negative value exceeding a defined threshold such that the short pulse trace no longer has a sufficient dynamic range. From this point, the short pulse-width trace may only be selected in case of a large spontaneous rise of signal level, according to exemplary embodiments.

However, at S405, the OTDR has determined that the amplitude of the short pulse-width signal is less than or equal to that of the longer pulse-width signal, and therefore, the longer pulse-width signal is outside of its dead-zone and the OTDR stitches the longer-pulse-width signal or a filtered version of the longer pulse-width signal onto an OTDR trace. The above formula may represent multiple ratios for any of a first light signal and subsequent light signals having respectively different pulse-width.

Although exemplary embodiments of the disclosure have been shown and described, it would be appreciated by those skilled in the art that changes may be made in these exemplary embodiments without departing from the principles and spirit of the exemplary embodiments, the scope of which is defined in the claims and their equivalents.

REFERENCE SIGNS LIST

OTDR 100
light generation section 101
light I/O 102
exit path 103
return path 104
detection section 105
selector 106
processor 107
display 108
memory 109
receivers 301-305
selection unit 205
input 210
output 220
traces 301*a*-303
traces 301*b*-303*b*
stitching point 310
stitching point 311
OTDR system 1000
selector section 2000
graph 3000*a*
graph 3000*b*
flowchart 4000

What is claimed is:

1. An Optical Time Domain Reflectometer (OTDR) comprising:
  a processor; and
  a non-transitory, tangible memory storing executable instructions that, when executed by the processor, cause the processor to perform:
    generating a first light signal comprising a light pulse-width having a first duration;
    generating a second light signal comprising a light pulse-width having a second duration longer than the first duration;
    generating a third light signal comprising a light pulse-width having a third duration longer than the second duration;
    transmitting the first light signal, the second light signal and the third light signal to an optical fiber;
    receiving reflections of the first light signal, the second light signal and the third light signal from the optical fiber;
    converting the reflections into a first electrical signal, corresponding to the first light signal, a second electrical signal, corresponding to the second light signal, and a third electrical signal, corresponding to the third light signal;
    generating a first OTDR trace corresponding to the first electrical signal, a second OTDR trace corresponding to the second electrical signal, and a third OTDR trace corresponding to the third electrical signal;
    stitching a portion of the first OTDR trace to a portion of the second OTDR trace at an intersection of the second electrical signal with the first electrical signal, whereby a ratio of total noise to be combined minimizes a backscatter noise level; and
    stitching the portion of the second OTDR trace to a portion of the third OTDR trace at an intersection of the third electrical signal with the second electrical signal, whereby a ratio of total noise to be combined minimizes a backscatter noise level.

2. The OTDR of claim 1, wherein stitching the portion of the first OTDR trace to the portion of the second OTDR trace further comprises mixing a first ratio of the first OTDR trace and second OTDR trace into points of an output OTDR trace proximate the first stitching point, and wherein stitching the portion of the second OTDR trace to the portion of the third OTDR trace further comprises mixing a second ratio of the second OTDR trace and the third OTDR trace into points of the output OTDR trace proximate the second stitching point.

3. The OTDR of claim 2, wherein the first ratio and the second ratio satisfy the following:

$$L'(n)=a*L(n)+b*S'(n)$$

L(n) denotes the second light signal for the first ratio;
L(n) denotes the third light signal for the second ratio;
"a" and "b" denote two parameters to be chosen such that a ratio of total noise of L'(n) to be combined minimizes a backscatter noise level;
S'(n) is a moving average filter with a length P1-Ps, where P1 represents the second duration and Ps represents the first duration for the first ratio; and
S'(n) is a moving average filter with a length P1-Ps, where P1 represents the third duration and Ps represents the second duration for the second ratio.

4. The OTDR of claim 1, wherein the stitching further comprises:
  applying a first gain to the first electrical signal;

applying a second gain, different than the first gain, to the second electrical signal;
applying a third gain, different than the first gain and second gain, to the third electrical signal;
re-testing the first light signal on the optical fiber;
re-testing the second light signal on the optical fiber;
re-testing the third light signal on the optical fiber;
averaging a result of re-testing the first light signal;
averaging a result of re-testing the second light signal;
averaging a result of re-testing the third light signal;
multiplying the first OTDR trace by a product of the light pulse-width having the first duration and the light pulse width having the second duration, a number of averages and the second gain;
multiplying the second OTDR trace by a product of the light pulse-width having the first duration and the light pulse width having the second duration, the number of averages and the first gain; and
multiplying the third OTDR trace by a product of the light pulse-width having the second duration and the light pulse width having the third duration, the number of averages and one of the first or second gain.

5. A method of using an Optical Time Domain Reflectometer (OTDR) comprising:
generating a first light signal comprising a light pulse-width having a first duration;
generating a second light signal comprising a light pulse-width having a second duration longer than the first duration;
generating a third light signal comprising a light pulse-width having a third duration longer than the second duration;
transmitting the first light signal, the second light signal and the third light signal to an optical fiber;
receiving reflections of the first light signal, the second light signal and the third light signal from the optical fiber;
converting the reflections into a first electrical signal, corresponding to the first light signal, a second electrical signal, corresponding to the second light signal, and a third electrical signal, corresponding to the third light signal;
generating a first OTDR trace corresponding to the first electrical signal, a second OTDR trace corresponding to the second electrical signal, and a third OTDR trace corresponding to the third electrical signal;
stitching a portion of the first OTDR trace to a portion of the second OTDR trace at an intersection of the second electrical signal with the first electrical signal, whereby a ratio of total noise to be combined minimizes a backscatter noise level;
stitching the portion of the second OTDR trace to a portion of the third OTDR trace at an intersection of the third electrical signal with the second electrical signal, whereby a ratio of total noise to be combined minimizes a backscatter noise level.

6. The method of claim 5, wherein stitching the portion of the first OTDR trace to the portion of the second OTDR trace further comprises mixing a first ratio of the first OTDR trace and the second OTDR trace into points of an output OTDR trace proximate the first stitching point, and wherein stitching the portion of the second OTDR trace to the portion of the third OTDR trace further comprises mixing a second ratio of the second OTDR trace and the third OTDR trace into points of the output OTDR trace proximate the second stitching point.

7. The method of claim 6, wherein the first ratio and the second ratio satisfy the following:

$$L'(n)=a*L(n)+b*S'(n)$$

L(n) denotes the second light signal for the first ratio;
L(n) denotes the third light signal for the second ratio;
"a" and "b" denote two parameters to be chosen such that a ratio of total noise of L'(n) to be combined minimizes a backscatter noise level;
S'(n) is a moving average filter with a length P1-Ps, where P1 represents the second duration and Ps represents the first duration for the first ratio; and
S'(n) is a moving average filter with a length P1-Ps, where P1 represents the third duration and Ps represents the second duration for the second ratio.

8. The method of claim 5, wherein the stitching further comprises:
applying a first gain to the first electrical signal;
applying a second gain, different than the first gain, to the second electrical signal;
applying a third gain, different than the first gain and the second gain, to the third electrical signal;
re-testing the first light signal on the optical fiber;
re-testing the second light signal on the optical fiber;
re-testing the third light signal on the optical fiber;
averaging results of re-testing the first light signal;
averaging results of re-testing the second light signal;
averaging results of re-testing the third light signal;
multiplying the first OTDR trace by a product of the light pulse-width having the first duration and the light pulse width having the second duration, a number of averages and the second gain;
multiplying the second OTDR trace by a product of the light pulse-width having the first duration and the light pulse width having the second duration, the number of averages and the first gain; and
multiplying the third OTDR trace by a product of the light pulse-width having the second duration and the light pulse width having the third duration, the number of averages and one of the first or second gain.

9. A method of generating a merged trace along an optical fiber with an Optical Time Domain Reflectometer (OTDR), the method comprising:
generating a first light signal with a light generation section of the OTDR, the first light signal having a first pulse width;
generating a second light signal with the light generation section of the OTDR, the second light signal having a second pulse width greater than the first pulse width;
generating a third light signal with the light generation section of the OTDR, the third light signal having a third pulse width greater than the second pulse width;
transmitting the first light signal, the second light signal and the third light signal to the optical fiber from a light Input/Output of the OTDR;
receiving reflections of the first light signal, the second light signal and the third light signal from the optical fiber with a detection section of the OTDR;
converting the reflections into a first electrical signal corresponding to the first light signal, a second electrical signal corresponding to the second light signal, and a third electrical signal corresponding to the third light signal with the detection section of the OTDR; and
generating a merged OTDR trace by stitching a portion of the first electrical signal to a portion of the second electrical signal at a first stitching point with a selector of the OTDR, stitching the portion of the second electrical signal to a portion of the third electrical signal at a second stitching point with the selector of the OTDR, and outputting the stitched portions to a display of the OTDR;

wherein the first stitching point is defined at an intersection of the second electrical signal with the first electrical signal such that a ratio of total noise to be combined minimizes a backscatter noise level and the second stitching point is defined at an intersection of the third electrical signal with the second electrical signal such that a ratio of total noise to be combined minimizes a backscatter noise level.

10. The method of claim 9, wherein stitching the portion of the first electrical signal to the portion of the second electrical signal further comprises mixing a first ratio of the first electrical signal and the second electrical signal into points of the merged OTDR trace proximate the first stitching point, and wherein stitching the portion of the second electrical signal to the portion of the third electrical signal further comprises mixing a second ratio of the second electrical signal and the third electrical signal trace into points of the merged OTDR trace proximate the second stitching point.

* * * * *